United States Patent
Schilling et al.

(10) Patent No.: US 6,801,346 B2
(45) Date of Patent: Oct. 5, 2004

(54) DIFFRACTIVE SAFETY ELEMENT

(75) Inventors: Andreas Schilling, Hagendorn (CH); Wayne Robert Tompkin, Baden (CH)

(73) Assignee: OVD Kinegram AG, Zug (CH)

( * ) Notice: Subject to any disclaimer, the term of this patent is extended or adjusted under 35 U.S.C. 154(b) by 0 days.

(21) Appl. No.: 10/477,171

(22) PCT Filed: May 31, 2002

(86) PCT No.: PCT/EP02/05988
§ 371 (c)(1),
(2), (4) Date: Nov. 6, 2003

(87) PCT Pub. No.: WO02/100654
PCT Pub. Date: Dec. 19, 2002

(65) Prior Publication Data
US 2004/0130760 A1 Jul. 8, 2004

(30) Foreign Application Priority Data
Jun. 8, 2001 (DE) .......................................... 101 27 979

(51) Int. Cl.⁷ ................................................ G03H 1/00
(52) U.S. Cl. .............................. 359/2; 359/566; 283/85; 430/10; 428/29; 428/916
(58) Field of Search ........................... 359/2, 566, 567; 283/85, 86; 430/10; 428/29, 916

(56) References Cited

U.S. PATENT DOCUMENTS

| | | |
|---|---|---|
| 4,568,141 A | 2/1986 | Antes |
| 4,984,824 A | 1/1991 | Antes et al. |
| 5,032,003 A | 7/1991 | Antes |
| 5,487,567 A * | 1/1996 | Volpe ........................... 283/72 |
| 5,737,886 A | 4/1998 | Kruckemeyer |
| 6,222,650 B1 * | 4/2001 | Long .............................. 359/2 |
| 6,342,969 B1 * | 1/2002 | Lee ............................. 359/569 |

FOREIGN PATENT DOCUMENTS

| | | |
|---|---|---|
| EP | 0 105 099 A1 | 4/1984 |
| EP | 0 201 323 A2 | 11/1986 |
| EP | 0 330 738 A1 | 9/1989 |
| EP | 0 375 833 A1 | 7/1990 |
| EP | 0 490 457 A1 | 6/1992 |
| JP | 09 220 892 | 8/1997 |
| JP | 10 332 916 | 12/1998 |
| JP | 10-332916 | * 12/1998 |

OTHER PUBLICATIONS

Optical Document Security, van Renesse, Editor ISDN No. 0–89006–982–4, chap. 7, "Modulation of Printed Gratings as a Protection Against Copying," pp. 127–148.

* cited by examiner

Primary Examiner—Leo Boutsikaris
(74) Attorney, Agent, or Firm—Hoffmann & Baron, LLP

(57) ABSTRACT

A security element is embedded in a layer composite of plastic material and has reflecting, optically variable surface patterns which can be visually recognized from predetermined observation directions and which are formed from a mosaic of surface elements occupied by optically active structures. A part of the surface pattern is additionally covered by a regularly arranged matrix of unit cells. Each unit cell is occupied by a single elementary surface or a group of identical surface portions that contain optically active structures which are independent of the mosaic of the surface pattern. The arrangement of the elementary surfaces and the surface portions in the matrix form an item of concealed information which is not perceptible to the naked eye, in the form of graphic or alphanumeric characters which however are reproduced in a color photocopy with a color or gray value contrast which is perceptible to the naked eye.

11 Claims, 2 Drawing Sheets

DIFFRACTIVE SAFETY ELEMENT

This application claims priority based on an International Application filed under the Patent Cooperation Treaty, PCT/EP02/05988, filed on May 31, 2002, and German Patent Application No. 101 27 979.5, filed on Jun. 8, 2001.

BACKGROUND OF THE INVENTION

The invention relates to a diffractive security element as set forth in the classifying portion of claim 1.

Such diffractive security elements are used for verifying the authenticity of a document and are distinguished by an optically variable pattern which changes in a striking and predetermined manner from the point of view of the person observing it by virtue of rotation or tilting movement.

Diffractive security elements of that known from many sources, reference is made here as representative examples to EP 0 105 099 B1, EP 0 330 738 B1 and EP 0 375 833 B1. They are distinguished by the brilliance of the patterns and the movement effect in the pattern, they are embedded in a thin laminate of plastic material and they are glued in the form of a stamp on to documents such as banknotes, bonds, personal identity papers, passports, visas, identity cards and so forth. Materials which can be used for production of the security elements are summarised in EP 0 201 323 B1.

Modern photocopiers and scanner devices are capable of duplicating such a document in apparently true colors. The diffractive security elements are also copied, in which case admittedly the brilliance and the movement effect are lost so that the pattern which is visible in the original at a single predetermined angle of view is reproduced as an image with the printing colors of a color photocopier. Such copies of documents can be easily confused with the original under poor lighting conditions or if the observer is not paying attention. The known security elements suffer from the disadvantage that the man in the street cannot easily recognise the copies as being such.

It is known from EP 0 490 457 B1 that it is possible to dispose in a visually recognisable image a second, visually unrecognisable image comprising fine line portions. The content of the second image is coded in the slope of the line portions with respect to the line portions of the background. In the copying operation the second image appears over the first image with a blackening effect which is dependent on the slope angles of the line portions. Therefore the second image is dependent on the position of the original on the copier machine. Theoretical considerations in that respect are set forth in 'Optical Document Security', van Renesse, Editor, ISDN No 0-89006-982-4, pages 127–148.

SUMMARY OF THE INVENTION

The object of the present invention is to provide a visually recognisable, inexpensive diffractive security element having an optically variable surface pattern which, in a copy produced by a color photocopier, has second concealed information which is independent of the surface pattern and which is not visible to the naked eye.

In accordance with the invention the specified object is attained by the features recited in the characterising portion of claim 1. Advantageous configurations of the invention are set forth in the appendant claims.

BRIEF DESCRIPTION OF THE DRAWINGS

Embodiments of the invention are described in greater detail hereinafter and illustrated in the drawing in which.

DESCRIPTION OF THE PREFERRED EMBODIMENTS

Figure 1:
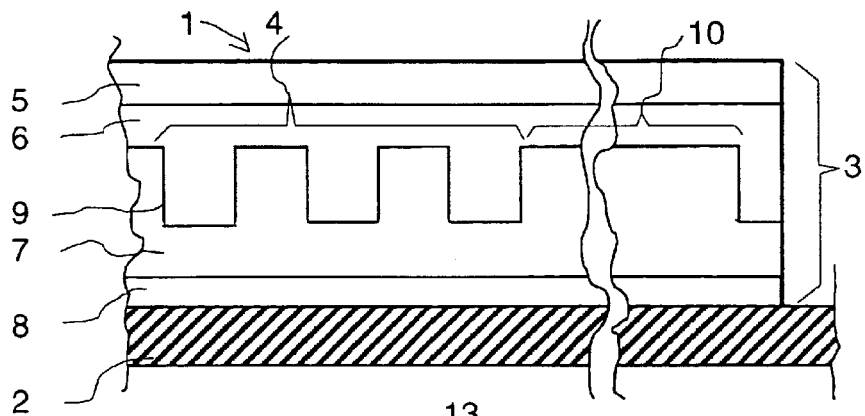
FIG. 1 is a view in cross-section through an optically variable security element.

In FIG. 1, reference 1 denotes an optically variable security element, reference 2 denotes a substrate, reference 3 a layer composite, reference 4 a microscopically fine structure, reference 5 a cover layer, reference 6 a lacquer layer, reference 7 a protective lacquer layer, reference 8 an adhesive layer, reference 9 an interface layer and reference a mirror surface. In the illustrated cross-section through a document the layer composite 3 of the security element 1 is joined to the substrate 2 by means of the adhesive layer 8. The term documents is used to denote in particular passes, banknotes, visas, bonds, entry cards and so forth which serve as a substrate 2 for the security element 1 and the authenticity of which is verified by the security element 1 stuck thereon. The microscopically fine, mechanically or holographically produced, optically active structures 4 are embedded in a layer composite 3 of plastic material. For example the layer composite 3 comprises, in the specified sequence, the transparent cover layer 5 which is as clear as glass. Arranged under the cover layer 5 is a transparent lacquer layer 6 in which the microscopically fine structure 4 is formed. The structure 4 is covered with a protective lacquer layer 7 in such a way that grooves of the structure 4 are filled by the protective lacquer layer 7 and the structure 4 is embedded between the lacquer layer 6 and the protective lacquer layer 7. An adhesive layer 8 is disposed between the substrate 2 and the protective lacquer layer 7 in order to fixedly connect the layer composite 3 to the substrate 2. The layers 5 and 6, and 7 and 8 respectively can be of the same respective material in other embodiments so that there is no interface between the layers 5 and 6, and 7 and 8 respectively. The structure 4 determines the shape of an interface 9 between the layers 6 and 7. The optical effectiveness of the interface 9 increases with the difference in the refractive indices of the materials in the two adjoining layers, the lacquer layer 6 and the protective lacquer layer 7. To increase the optical effectiveness of the interface 9 the structure 4, prior to application of the protective lacquer layer 7, is covered with a metallic or dielectric reflection layer which is thin in comparison with the depths of the grooves. Other embodiments of the layer composite 3 and the materials which can be used for transparent or non-transparent security elements 9 are described in EP 0 201 323 B1 to which reference is made in the opening part of this specification. The structure 4 shown in FIG. 1 is only symbolically illustrated in the form of a simple rectangular structure and stands for general, optically active structures 4 such as light-diffractive relief structures, light-scattering relief structures or mirror surfaces 10 (FIG. 1). Known light-diffractive relief structures are linear or circular diffraction gratings and holograms. The light-scattering relief structures are for example matt structures.

Figure 2:
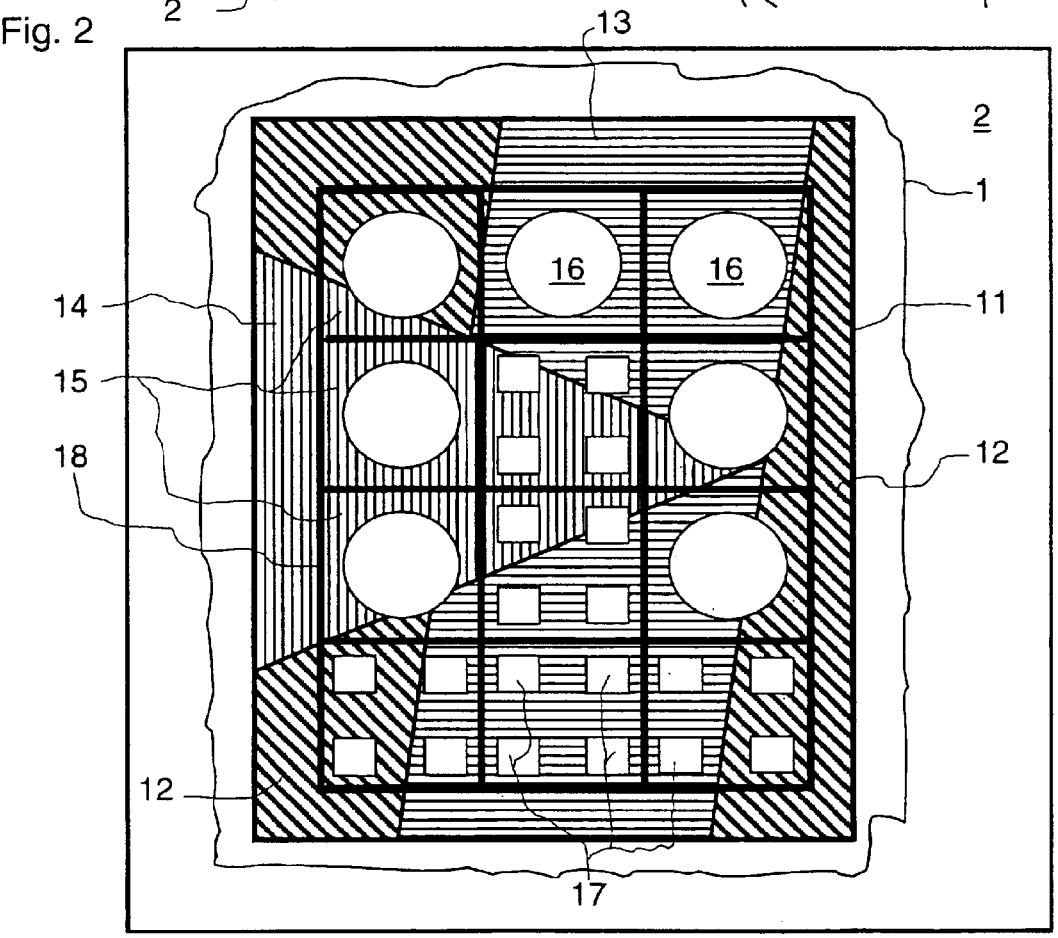
FIG. 2 shows a surface pattern.

FIG. 2 shows the security element 1 disposed on the substrate 2. Through the cover layer 5 (FIG. 1) an observer viewing it, from predetermined observation angles, visually recognises the effect of the optically active structures 4 (FIG. 1) of a surface pattern 11. The surface pattern 11 is a mosaic of many surface elements 12, 13, 14, in the surfaces of which the optically active structures 4 are formed. From the point of view of the observer, only the respective surface elements 12, 13, 14 which deflect light incident on to their optically active structures 4 into the eye of the observer are visible. Other surface elements 12, 13, 14 become visible by virtue of rotation or tilting of the security element 1 about one of its three axes, and therefore alter the image which can be recognised by virtue of the optical effect of the surface pattern 11.

Independently of the surface elements 12, 13, 14, at least a part of the surface pattern 11 is covered with a network comprising a plurality of unit cells 15 of for example square or hexagonal shape. The unit cells 15 are of dimensions of smaller than 0.2 mm. The unit cells 15 have an elementary surface 16 aligned with their center or a group of regularly arranged surface portions 17. The elementary surfaces 16 are of a circular shape or are in the shape of a regular polygon. The unit cells 15 form a matrix 18 which in reality is not present and which only serves to more easily explain the predetermined arrangement of the elementary surfaces 16 on the surface pattern 11. Formed in the elementary surfaces 16 and the surface portions 17 are optically active structures 4 such as light-diffracting or light-scattering relief structures, or mirror surfaces 10, which are Independent of the optically active structures 4 of the surface elements 12, 13, 14. The optically active structures 4 of the surface elements 12, 13, 14, in the unit cells 15, fill the areas outside the elementary surfaces 16 or the surface portions 17 respectively, according to the organisation of the surface elements 12, 13, 14 in the surface pattern 11. The organisation is only shown by way of example in the drawing in FIG. 2 and only illustrates the independence of the matrix 18 from the organisation of the surface pattern 11. The surface elements 12 through 14 are mostly much larger than the unit cells 15. The unit cells 15 are identical in size and shape and of a dimension of less than 0.2 mm. The elementary surfaces 16 have a largest dimension (diameter, diagonal) of less than 0.2 mm, for example 0.17 mm. This means that the dimensions are so small that the elementary surfaces 16 in the surface pattern 11 can no longer be recognised by the naked eye at a viewing distance of 30 cm, that is to say, the observer, upon rotation and tilting, only recognises a background with the images of the surface pattern 11, which are dependent on the observation direction and which are produced by the surface elements 12 through 14. The surface area proportion of the elementary surface 16 in the unit cell 15 is of a value in the range of between 40% and 70% of the surface area of the unit cell 15, for example 57%. In regions with the unit cell 15 with the elementary surface 16 the observer detects a contrast as a consequence of a noticeable loss of brightness when he compares those regions to the surface elements 12 through 14 without those elementary surfaces 16.

In the unit cells 15 the elementary surfaces 16 are so arranged that they form a pattern, for example a script or a graphic character, the matrix 18 of the unit cells 15 being a pixel organisation of that pattern. In accordance with the foregoing, the observer could recognise that pattern on the basis of the contrast. So that the information contained In the pattern is not recognised by the naked eye, the unit cells 15 which are free of the elementary surfaces 16 are to be so reduced in respect of their effective area that their surface brightness is matched to the unit cells 15 with the elementary surfaces 16 and the contrast disappears, from the point of view of the observer, A group of the surface portions 17 is written into each unit cell 15 which is free of elementary surfaces 16. The total area of the surface portions 17 in the unit cell 15 corresponds to the elementary surface 16. At least three surface portions 17 are arranged in the unit cell and distributed as uniformly as possible, having regard to the adjacent unit cells 15. The dimensions of the unit cells 15, the elementary surfaces 16 and the surface portions 17 are far below the level of resolution of the human eye.

Figure 3A:
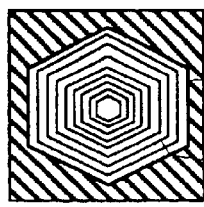
FIG. 3 shows a unit cell with an elementary surface with a circular diffraction grating.
Figure 3B:
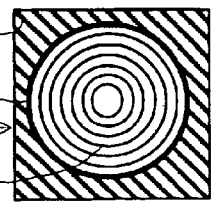

In each elementary surface 16 or in each surface portion 17 of the unit cell 15 the optically active structure of the elementary surface 16 or the surface portion 17 interrupts the optically active structures 4 of the surface elements 12 through 14. The elementary surface 16 or the surface portion 17 is advantageously in the form of a mirror surface 10 or has a matt structure or a diffraction grating. FIG. 3a shows a hexagonal elementary surface 16 as an example of an elementary surface 16 involving the shape of a regular polygon. A circular diffraction grating 19 with grooves in hexagonal form completely fills the hexagonal elementary surface 16. The groves therefore advantageously involve the shape of the elementary surface 16. In FIG. 3b the circular elementary surface 16 is occupied by the circular diffraction grating 19 with round grooves. The rest of the surface of the unit cell 15 has for example the optically active structure 4 (FIG. 1) of the surface element 12. The circular diffraction gratings 19 involve a predetermined spatial frequency f. The relief structure of a Fresnel lens is also suitable for the elementary surfaces 16. Fresnel lens structures are unsuitable for the much smaller surface portions 17 (FIG. 2). Advantageously, elementary surfaces 16 with a Fresnel lens are combined with surface portions 17 occupied by the matt structure as then both the elementary surfaces 16 and also the surface portions 17 deflect white light to the observer.

The unit cell 15 considered hitherto is of a square shape. However a rectangular or hexagonal shape for the unit cell 15 also permit the surface of the matrix 18 to be covered without any gap (FIG. 2).

Figure 4:
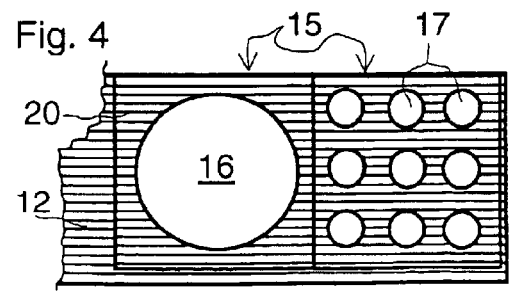
FIG. 4 shows other unit cells.

FIG. 4 shows two unit cells 15, wherein the one unit cell 15 shows the elementary surface 16 surrounded by the optically active structure 4 of the surface element 12 as background. The surface portions 17 are arranged on the other unit cell 15 in front of the same background. Advantageously, the elementary surfaces .16 and the surface portions 17 respectively in a pattern involve the same optically active structure 4, for example a linear diffraction grating 20.

An advantage of the present invention is the high reproducibility of the arrangement of the elementary surfaces 16 and the surface portions 17 in the surface element 11 as the optically active structures of the elementary surfaces 16 and the surface portions 17 together with the optically active structure,4 can be formed in a working operation in the lacquer layer 6 (FIG. 1). In the security element 1 the elementary surfaces 16 and the surface portions 17 are arranged under the cover layer and therefore protected from mechanical and/or chemical attack.

Figure 5:
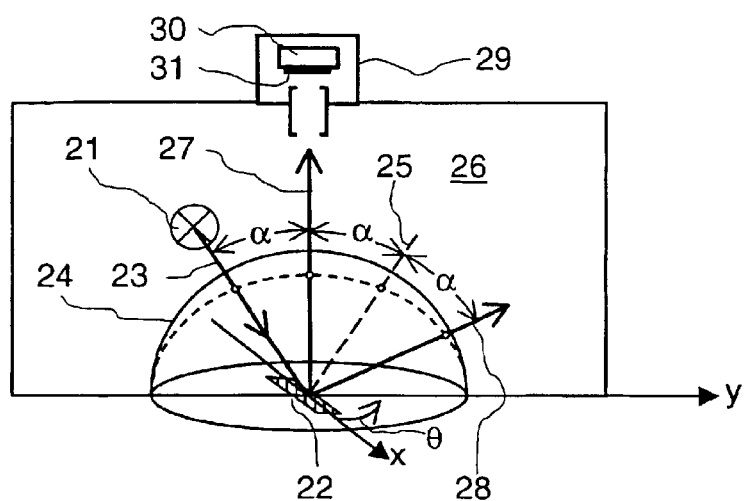
FIG. 5 is a view in cross-section through an optical scanning apparatus.

FIG. 5 is a diagrammatic view in cross-section through a digital optical scanning apparatus (=scanner) of a modern color photocopier, referred to hereinafter as a color photocopier. A narrow strip 22 which is illuminated by means of a white light source 17 is in a plane defined by co-ordinate directions x and y. The strip 22 is an illuminated part of the surface pattern 11 (FIG. 2) or the elementary surfaces 16

(FIG. 2) and the surface portions 17 (FIG. 2). At least a part of the light beam 23 which is incident on the strip 22 is reflected back into a half-space 24 above the illuminated strip 22. If the strip 22 is a mirror surface 10 (FIG. 1) then the incident light is returned primarily in accordance with the laws of reflection in the form of a reflection beam 25. The direction of the incident light beam 23 and the reflection beam 25 define a diffraction plane 26. The diffraction plane 26 intersects the half-space 24 which is shown in the form of a hemisphere in a large circle shown in broken line and is perpendicular to the x-y plane. The strip 22 is covered by a diffraction grating 20 (FIG. 4) whose grating vector (not shown here) is in the diffraction plane 26 and is oriented relative to the co-ordinate direction y, that is to say relative to the scanning direction. The grating vector has an azimuth θ of 90° or 270° respectively as measured with respect to the co-ordinate direction x. The light diffracted at the linear diffraction grating 20 is split up into spectral colors and diverted in the diffraction plane 26 in directions 23, 24 which are symmetrical with respect to the reflection beam 25. The spatial frequency f and the wavelength λ of the diffracted light determine the diffraction angle between the reflection beam 25 and the directions 27 and 28 respectively. In the illustrated example the direction 24 is perpendicular to the x-y plane. The parameters of the diffraction grating are to be so selected that the light beam 23 is diffracted for a predetermined spectral color in the direction 27, of the normal to the x-y plane, and registered by a light receiver 29. If the grating vector deviates from the azimuth θ=90° or 270° respectively and/or the diffracted light does not pass into the light receiver 29 because of an inappropriate spatial frequency f, then the strip 22 is reproduced by the color photocopier in a dark gray color because of the light which is scattered at the relief structure of the diffraction grating 20. If the diffraction grating 20 has a very high line density (>2,500 lines/mm), not even its first order can be emitted into the half-space 20, thus the zero-order diffraction grating 20 behaves like a colored mirror and like the mirror surface 10 is registered as black in the color photocopier as no light is incident in the light receiver 29. If the strip 22 has a matt structure the incident white light 23 is scattered without being spectrally split up into the entire half-space 24 and is registered by the color photocopier according to the intensity thereof as white or gray. In contrast to an isotropic matt structure an anisotropic matt structure preferably deflects the incident light 23 into a predetermined spatial angle region. The anisotropic matt structure permits the reproduction of predetermined gray values. If the strip 22 absorbs the incident light 23 no light is sent back into the half-space 24. The angle of incidence of the light beams 23 on the x-y plane involves a value in the range of between 25° and 30° and is typical for the respective manufacturer of the color photocopier.

The use of various linear zero-order diffraction gratings 20 for the structure of the elementary surfaces 16 and the surface portions 17 of the matrix 18 affords a mosaic image of variously-colored mirror surfaces if the matrix is divided into color regions of the mosaic image, which are independent of the concealed information and the mosaic of the surface pattern 11. The observer recognises the mosaic image under the observation conditions for specular reflection, that is to say independently of the direction of the grating vector, in which case the naked eye cannot resolve the elementary surfaces 16 and the surface portions 17. The color regions of the matrix 18, in which the elementary surfaces 16 and the surface portions 17 are occupied with the same zero-order diffraction grating structures therefore appear to the observer as homogeneous color surfaces. From the point of view of the observer, into whose eye the reflection beams 25 pass, the multi-colored mosaic image is visible in specular reflection; in the color photocopier in contrast, as in the case of the flat mirror, no light from the mosaic image passes into the light receiver 29. The advantage of the mosaic image is an additional feature for distinguishing the original of the security element 1 from a color copy which does not have the mosaic image. Instead of a single linear diffraction grating 20 for the entire color region, in the color region at least two diffraction grating elements with differing spatial frequencies f, which are distributed uniformly in the zero-order diffraction grating structure of the color region, give from the point of view of the observer a mixed color which is dependent on the spatial frequencies f and the surface area proportions of the diffraction grating elements.

A color photocopier has a resolution of at least 12 dots/mm (=300 dpi) in each of the Cartesian co-ordinate directions x and y. The white light source 21 emits the light beams 23 in parallel relationship with the illustrated diffraction plane 26 obliquely on to the strip 22 and illuminates the narrow strip 22 which is oriented along the co-ordinate direction x. All light which is returned in the direction 27 passes into one of a plurality of photodetectors 30 of the light receiver 29. The light receiver 29 is diagrammatically shown in section in FIG. 5. In the co-ordinate direction x the illuminated narrow strip 22 and the light receiver 29 extend over the entire width of a support for the substrates 2 to be copies (FIG. 1), for example an A4 or A3 sheet. At least twelve photodetectors 30 per millimeter are arranged for each of the three primary colors. For the digital scanning operation the white light source 21 and the light receiver 29 move stepwise in the co-ordinate direction y. In each step an image, which is registered in the light receiver 29 on photosensitive surfaces 31 of the photodetector 30, of the illuminated narrow strip 22 is scanned dot-wise by the photodetectors 30. In the operation of reading out the image intensity values in respect of the light beams 23 deflected in the direction 27 are registered by the photodetectors 30.

As a consequence of the finite resolution in the light receiver 29, the registered signal depends on the filling and structuring of the unit cell 15. Because of the resolution of the color photocopier an elementary surface 16 (FIG. 2) is detected and reproduced in a color copy while the much smaller surface portions 17 are not detected by the color photocopier and are suppressed in the color photocopy. Therefore the information concealed in the surface pattern 11 is made visible in the color photocopy. A possible configuration of the color photocopier suppresses the signal of an individual photodetector 30 if adjacent photodetectors 30 register very greatly differing intensity values, insofar as the differing signal is adjusted to the adjacent values. That suppresses interference signals. That procedure is performed for each primary color independently of the other two. Similar intensity comparison operations in the co-ordinate direction y are not effected. As only the elementary surfaces 16 are registered the concealed information is independent of the scanning direction of the color photocopier. The maximum dimension of the surface portions 17 in the form of a square or circle or another regular area determines the level of color photocopier resolution, up to which the described protective effect is operative. If for example the maximum dimension is 0.04 mm or 0.02 mm, then the protective effect is given in the case of a color photocopier with a degree of resolution of up to 24 dots/mm (=600 dpi) and 48 dots/mm (=1200 dpi) respectively, as a signal in respect of the surface portion 17 is suppressed in the scanning operation because at most one individual photodetector 30 produces a signal for the surface portion 17. In regard to the elementary surface 16 in contrast the color photocopier detects the elementary surface 16 as, even with a low level of resolution of 12 dots/mm, at least two mutually juxtaposed photodetectors 30 register the signal in respect of the elementary surface 16.

So that the diffracted light is deflected into the direction 27, the normal to the x-y plane, from the surface elements 12, 13, 14 (FIG. 2) or the elementary surfaces 16 or the surface portions 17, into the light receiver 29, the spatial frequencies f in accordance with the equation:

$$\sin(\delta=0°)-\sin(\alpha)=k\cdot\lambda\cdot f$$

must be selected, for the light-diffracting structures 4 (FIG. 1), wherein a is the angle of incidence of the light beams 23, δ=0° is the diffraction angle of the light diffracted into the direction 27 normal to the x-y plane, of the wavelength λ and k is the diffraction order. For an angle of incidence a of between 25° and 30° and with k=1 the range of the spatial frequencies f is between 725 lines/mm and 1025 lines/mm; with k=2 the usable spatial frequencies f are between 350 lines/mm and 550 lines/mm so that the diffracted light passes to the light receiver 29. The range limits are predetermined by the color sensitivity of the light receiver 29. In order to compensate for possible unevenness of the surface pattern 11 it is advantageous to modulate the spatial frequency f, in which case the spatial frequency f changes periodically over a period of between 0.2 mm and 0.6 mm with a variation of 5 lines. That consideration applies only so long as the grating vector of the linear diffraction grating 20 is contained in the diffraction plane 26, that is to say as long as the scanning direction is substantially parallel to the grating vector. With any scanning direction the grating vector penetrates the diffraction plane 26 and the linear diffraction grating 20, irrespective of its spatial frequency f, acts like a matt structure and is reproduced by the color photocopier in a gray shade.

Less critical in regard to the illumination conditions in the color photocopier are the examples in which the surface elements 12 through 14 have a mirror surface 10 (FIG. 1) or one of the light-diffracting structures whose spatial frequency f does not come from the above-described spatial frequency range and the elementary surfaces 16 and the surface portions 17 have one of the matt structures or in which the elementary surfaces 16 and the surface portions 17 are occupied by the mirror surface 10 and the surface elements 12 through 14 are occupied by the matt structure or one of the light-diffracting structures with a spatial frequency f from the above-described spatial frequency range.

Figure 6:
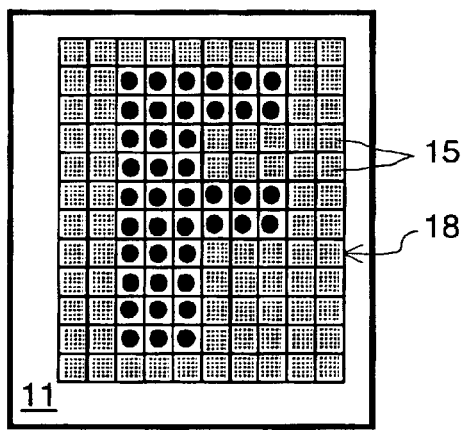
FIG. 6 shows an enlarged original of the security element.

FIG. 6 shows the greatly enlarged original of the surface pattern 11. Independently of the mosaic (not shown here) of the surface elements 12, 13, 14 (FIG. 2), a part of the surface pattern 11 is divided into the matrix 18. In this embodiment the matrix 18 of the mutually abutting unit cells 15 has a resolution of at least eight unit cells 15 per millimeter. The division of the surface pattern 11 into the unit cells 15 with the elementary surfaces 16 and with the surface portions 17 is determined by the concealed information. In this example the concealed information is the letter 'F'. With the naked eye, the observer is not in a position to recognise the concealed information as the unit cells 15 with the elementary surfaces 16 and the surface portions 17 are matched in respect of brightness.

A document with the substrate 2 with the security element 1 (FIG. 1) is copied with any orientation of the surface pattern 11, by means of the color photocopier.

Figure 7:
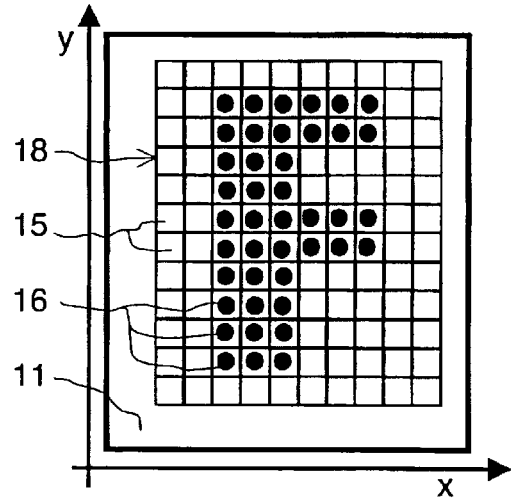
FIG. 7 shows an enlarged copy of the security element.

FIG. 7 is a view on the same enlarged scale showing the color copy of the original of the surface pattern 11. The mosaic of the surface elements 12, 13, 14 (FIG. 2) of the surface pattern 11 is reproduced in the way that the intensity of the light deflected at the optically active structures 4 (FIG. 1) of the surface pattern 11 in the direction 27 (FIG. 5) is registered. The elementary surfaces 16 are reproduced as dots or line portions (not shown here) connecting the elementary surfaces 16, in the color of the light deflected into the direction 27. The line portions are an artefact of the color photocopier. The surfaces which are filled with the dots and the line portions, the fine 'hatching', stand out from the surfaces which are free of hatching, by virtue of a color contrast. On the other hand the surface portions 17 (FIG. 2) are not reproduced in the color copy as the light receiver 29 (FIG. 5) does not register the surface portions 17 or suppresses the signal. The unit cells 15 with the surface portions 17 are such surfaces which are free of hatching. In the color copy the concealed information can be seen against the background of the surface elements 12, 13, 14, in this example the letter 'F', with the naked eye. The concealed information is reproduced in the color copy by a color contrast or a gray value contrast which is produced in the copying operation as an artefact of the color photocopier.

As mentioned above the light receiver 29 (FIG. 5) is subdivided into a finite number of photodetectors 30. Transversely with respect to the scanning direction the image of the strip 22, which is detected by the photodetectors 30, is resolved into individual pixels.

By way of example the surface pattern 11 is so oriented that the scanning direction coincides with the co-ordinate direction y. The boundaries of the matrix 18 are oriented in parallel relationship with the co-ordinate directions x and y. In the color copy of the security element 1 (FIG. 1) which is scanned in the co-ordinate direction y, in addition to the image of the color pattern 11 there are lines or line portions which connect the element surfaces 16, in the region of the unit cells 15 with the elementary surfaces 16, as an, artefact. The observer recognises the scanning direction used. It is perpendicular to the lines or line portions. The concealed information can also be attained by an interchanged arrangement of the elementary surfaces 16 and the groups of the surface portions 17 in the matrix 18.

Figure 8:
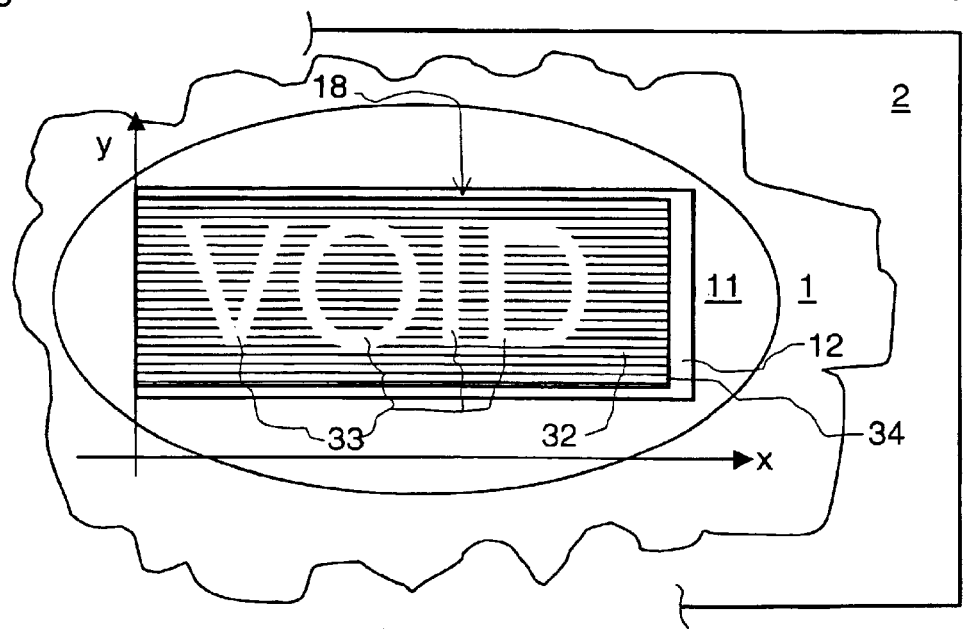
FIG. 8 shows a text panel in the security element.

FIG. 8 shows such a configuration. Within the surface pattern 11 the security element 1 has a background region 32 and character regions 33. The background region 32 has for example the matrix 18 (FIG. 2) in the form of a text panel 34 on which the character regions 33 form the concealed information. In the background region 32 the elementary surfaces 16 (FIG. 4) are arranged in the unit cells 15 and in the character regions 33 the surfaces portions 17 are arranged in the unit cells 15. The character regions 33 stand out in the color copy from the background region 32 by virtue of the color contrast in such a way that the concealed information is clearly visible to the naked eye.

In a first embodiment of the text panel 34 the surface element 12 has the linear diffraction grating 20 (FIG. 4) as an optically active structure (FIG. 1). In the color photocopier scanning is effected parallel to the grating vector of the diffraction grating 20 so that the surface of the surface element 12 is reproduced in the color which is predetermined by the spatial frequency f. The elementary surfaces 16 and the partial surfaces 17 have the mirror surfaces 10 (FIG. 1) as the optically active structure 4. The color copy shows the surface element 12 in the predetermined color, for example yellow, or in a gray shade, if the scanning direction and the grating vector do not coincide. In the color copy the background region 32 is of the color or the gray shade of the surface element 12, but the background region 32 is darkened as a consequence of the fine black hatching, with respect to the rest of the surface element 12. The character regions 33 which are free of the hatching therefore stand out from the background region 32 by virtue of the color or gray value contrast. In the illustrated example the character regions 33 form the information 'VOID'. Both upon reproduction of the surface element 12 in color and also in a gray shade the information can be readily perceived by the naked eye. Thus, irrespective of the scanning direction, the concealed information is clearly visible in the color copy, even if the appearance of the color copy of the surface pattern 11 depends on the scanning direction.

If the elementary surfaces 16 and the surface portions 17 also have a linear diffraction grating 20 with the spatial frequency $f_K$ as the optically active structure 4, the grating vector of which extends in parallel relationship with the grating vector of the diffraction structure having the spatial frequency $f_E$ in the surface element 12 and with respect to the scanning direction, for example the co-ordinate direction y, the spatial frequencies $f_K$ and $f_E$ from the above-described spatial frequency range must differ in such a way that in the color copy there is a clearly perceivable color contrast between the character regions 33 and the background region 32.

As soon as the scanning direction substantially no longer extends parallel to the two grating vectors, the background and the hatching in the background region 32 are reproduced practically in the same gray shade in the color copy, so that the information can no longer be seen.

That disadvantage is overcome if the circular diffraction grating 19 (FIG. 3) with the spatial frequency $f_K$ is formed in the elementary surfaces 16 as the optically active structure 4, as at least the hatching appears in the photocopy in the predetermined color from any scanning direction and thus the information is visible.

In a further embodiment the circular diffraction gratings 19 with the spatial frequency $f_E$ are regularly arranged in the surface elements 12 through 14 (FIG. 2) at least in the region of the text panel 34 so that the predetermined color of the surface element 12 is reproduced independently of the scanning direction in the color copy. The circular diffraction gratings 19 for example fill squares with a side length of about 100 micrometers and are placed in mutually butting relationship in the surface element 12.

In a further embodiment the surface element 12 has a matt structure. Mirror surfaces 10 cover the elementary surfaces 16 and the surface portions 17. In the color copy the surface element appears in a white to light-gray color while the black-hatched background region 32 is darkened.

In a further embodiment the surface element 12 has a mirror surface and the elementary surfaces 16 and the surface portions 17 involve the matt structure. In the color copy the surface element and the character regions 33 appear black. The background region 32 is lightened by the hatching in a white to light-gray color.

The four last-described embodiments have the advantage that the concealed information which in the original is not perceptible with the naked eye is made visible to the naked eye in the color copy independently of the scanning direction.

What is claimed is:

1. A security element comprising a reflecting, optically variable surface pattern which is embedded in a layer composite of plastic material and which can be visually recognized from predetermined observation directions, formed from a mosaic of surface elements with optically active structures, wherein a part of the surface pattern is divided in accordance with a regular matrix into cells of equal size, wherein each cell is occupied by a single elementary surface or a group of identical surface portions, the elementary surfaces and the surface portions contain an optically active structure which is independent of the mosaic of the surface pattern, provided in the matrix are at least five cells per mm, the diameter of the elementary surfaces is less than 0.2 mm and a largest dimension of the surface portions is less than 0.04 mm, wherein the elementary surface or the group of the surface portions occupies an equal surface area proportion in the range of between 40% and 70% of the cell, and the arrangement of the elementary surfaces and the surface portions in the matrix forms an item of concealed information which is not perceptible to the naked eye, being in the form of graphic or alphanumeric characters which however are reproduced in a color photocopy with a color or gray value contrast which can be recognized with the naked eye and which is produced upon copying as an artifact.

2. A security element as set forth in claim 1, wherein a unit cell of the matrix is of a rectangular or hexagonal shape.

3. A security element as set forth in claim 1, wherein the optically active structures in the elementary surfaces and in the surface portions are mirror surfaces and the optically active structures in the surface elements are microscopically fine, light-scattering or light-diffracting relief structures.

4. A security element as set forth in claim 1, wherein the optically active structures in the elementary surfaces and in the surface portions are microscopically fine, light-scattering or light-diffracting relief structures and the optically active structures in the surface elements are mirror surfaces.

5. A security element as set forth in claim 1, wherein the optically active structures both in the elementary surfaces and in the surface portions and also in the surface elements are microscopically fine, light-diffracting relief structures, wherein the light-diffracting relief structure of the elementary surfaces and the surface portions differs from the light-diffracting relief structures of the surface elements at least in respect of the azimuth and/or the spatial frequency.

6. A security element as set forth in claim 3, wherein the microscopically fine, light-diffracting relief structures are linear diffraction grating structures with predetermined spatial frequencies.

7. A security element as set forth in claim 3, wherein the microscopically fine, light-diffracting relief structures are circular diffraction gratings with predetermined spatial frequencies.

8. A security element as set forth in claim 6, wherein the spatial frequencies of the diffraction grating structures are selected from the ranges of between 350 and 550 lines per millimeter and/or between 725 and 1025 lines per millimeter.

9. A security element as set forth in claim 8, wherein the spatial frequency has a periodic modulation with a variation of five lines per millimeter over a period of between 0.2 mm and 0.6 mm.

10. A security element as set forth in claim 5, wherein the elementary surfaces and the surface portions of the matrix are associated with color regions of a mosaic image which is independent of the concealed information and the mosaic of the surface pattern and which comprises the color regions, and wherein in each of the color regions the elementary surfaces and the surface portions have a predetermined grating structure, which diffracts into the zero order, with spartial frequencies of higher than 2500 lines per millimeter.

11. A security element as set forth in claim 3, wherein the microscopically fine, light-scattering relief structure is a matt structure.

* * * * *